(12) United States Patent
Beckers

(10) Patent No.: US 8,341,048 B2
(45) Date of Patent: Dec. 25, 2012

(54) CHECK-CASHING/LOAN SYSTEM USING A VARIABLE AMOUNT ELECTRONIC FUNDS CARD

(76) Inventor: James Randall Beckers, Rockville, MD (US)

( * ) Notice: Subject to any disclaimer, the term of this patent is extended or adjusted under 35 U.S.C. 154(b) by 835 days.

(21) Appl. No.: 12/195,818

(22) Filed: Aug. 21, 2008

(65) Prior Publication Data

US 2009/0063342 A1 Mar. 5, 2009

Related U.S. Application Data

(60) Provisional application No. 60/968,136, filed on Aug. 27, 2007.

(51) Int. Cl.
*G06Q 40/00* (2012.01)
(52) U.S. Cl. ............................ 705/35; 709/220; 713/193
(58) Field of Classification Search ................ 705/1–55; 235/2–90, 350–379; 379/1–100; 250/1–288
See application file for complete search history.

(56) References Cited

U.S. PATENT DOCUMENTS

| | | | |
|---|---|---|---|
| 6,167,387 | A | 12/2000 | Lee-Wai-Yin |
| 7,232,371 | B2 | 6/2007 | Gatto et al. |
| 7,249,054 | B2 | 7/2007 | Keil |
| 2001/0013545 | A1* | 8/2001 | Hogan ........................... 235/380 |
| 2001/0018660 | A1* | 8/2001 | Sehr ................................... 705/5 |
| 2002/0107797 | A1* | 8/2002 | Combaluzier ................... 705/41 |
| 2005/0177489 | A1* | 8/2005 | Neff et al. ........................ 705/38 |
| 2005/0234820 | A1* | 10/2005 | MacKouse ....................... 705/40 |
| 2007/0214091 | A1 | 9/2007 | Hansen et al. |
| 2008/0313077 | A1* | 12/2008 | Schropfer ........................ 705/39 |

OTHER PUBLICATIONS

CardLogix Corp staff, Loyalty & Stored Value Cards, Apr. 4, 2004, CardLogix Corp, web, 1-13.*
https://www.walmartmoneycard.com/walmart/homepage.aspx.
https://www.walmartmoneycard.com/AcctMgmt/Controls/Walmart/Support/Faqs.aspx.
http://banxcard.com/card.htm.
http://www.cashpass.com.
http://www.usa.visa.com/personal/cards/prepaid/visa_buxx.html?it=12/personal/cards/prep....
Rolfe Winkler, "Green Dot's Wild Wal-Mart Ride," *The Wall Street Journal*, Tuesday, Oct. 12, 2010, p. C14.
Green Dot Corporation Investor Presentation, Sep. 2010.

* cited by examiner

*Primary Examiner* — Marissa Liu
(74) *Attorney, Agent, or Firm* — Staas & Halsey LLP

(57) ABSTRACT

A rechargeable and disposable electronic funds (cash card) issued by a non-financial facility, such as a check cashing facility, a payday loan facility or a short term loan facility, is disclosed where the card substitutes for the cash and is labeled in the name of a bank type financial institution with which the non-financial facility has a relationship. The card can be charged with a variable amount on money. When used at a store for a purchase it can act like a debit card but need not have a name of the holder associated with (or embossed on) it like a gift card, so the user can remain anonymous. The card can be upgraded to a rechargeable or debit/credit card. The card can draw on an account or sub account of the check cashing service or of the bank.

1 Claim, 7 Drawing Sheets

Figure 5        34

|              | 312 | 312 | 312 |
|---|---|---|---|
| 316 Card ID | ... | | |
| 318 Type | | | |
| 320 Balance | | | |
| 322 Hold Back/Reserve | | | |
| 324 Reserve Time | ... | | ... |
| 326 Name | | | |
| 328 Address | | | |
| 330 Financial Institution ID | | | |
| 332 Status | ... | | |
| 334 Expiration | | | |

314

| | |
|---|---|
| 352 | Facility ID |
| 354 | Balance |
| 356 | Financial ID |

| Current Balance | | 394 | ID | 408 | |
|---|---|---|---|---|---|
| Check/Loan Amount | | 396 | | Type | |
| Fee | 398 | Res. Amount | 400 | One Time Cash | 410 |
| | | Res. Date | 402 | | |
| Name | | 404 | | Cash | 412 |
| Address | | 406 | | Debit | 414 |
| | | | | Debit/Credit | 416 |
| Linked Acct | | 420 | | Credit | 418 |
| Linked Acct Bal. | | 422 | | Loan | 419 |
| Transfer Amount | | 424 | | | |

| 462 | 464 | 466 | 468 | 470 | 472 | 474 |

CHECK-CASHING/LOAN SYSTEM USING A VARIABLE AMOUNT ELECTRONIC FUNDS CARD

CROSS-REFERENCE TO RELATED APPLICATION(S)

This application is related to U.S. provisional application entitled A Check-Cashing/Loan System Using A Variable Amount Electronic Funds Card having Ser. No. 60/968,136, by Beckers, filed Aug. 27, 2007 and incorporated by reference herein.

BACKGROUND

1. Field

The embodiments discussed herein are directed to electronic transaction cards

2. Description of the Related Art

Check cashing services are a type of transaction that can be improved.

SUMMARY

It is an aspect of the embodiments discussed herein to provide improved check cashing services.

The above aspects can be attained by a system that includes the components and processes as described in the embodiments herein.

These together with other aspects and advantages which will be subsequently apparent, reside in the details of construction and operation as more fully hereinafter described and claimed, reference being had to the accompanying drawings forming a part hereof wherein like numerals refer to like parts throughout.

BRIEF DESCRIPTION OF THE DRAWINGS

FIG. 5 depicts a database or data structure of the facility.

FIG. 6 depicts a graphical user interface or display of the facility.

FIG. 7 illustrates a sample transaction.

DETAILED DESCRIPTION OF THE EMBODIMENTS

Figure 1:
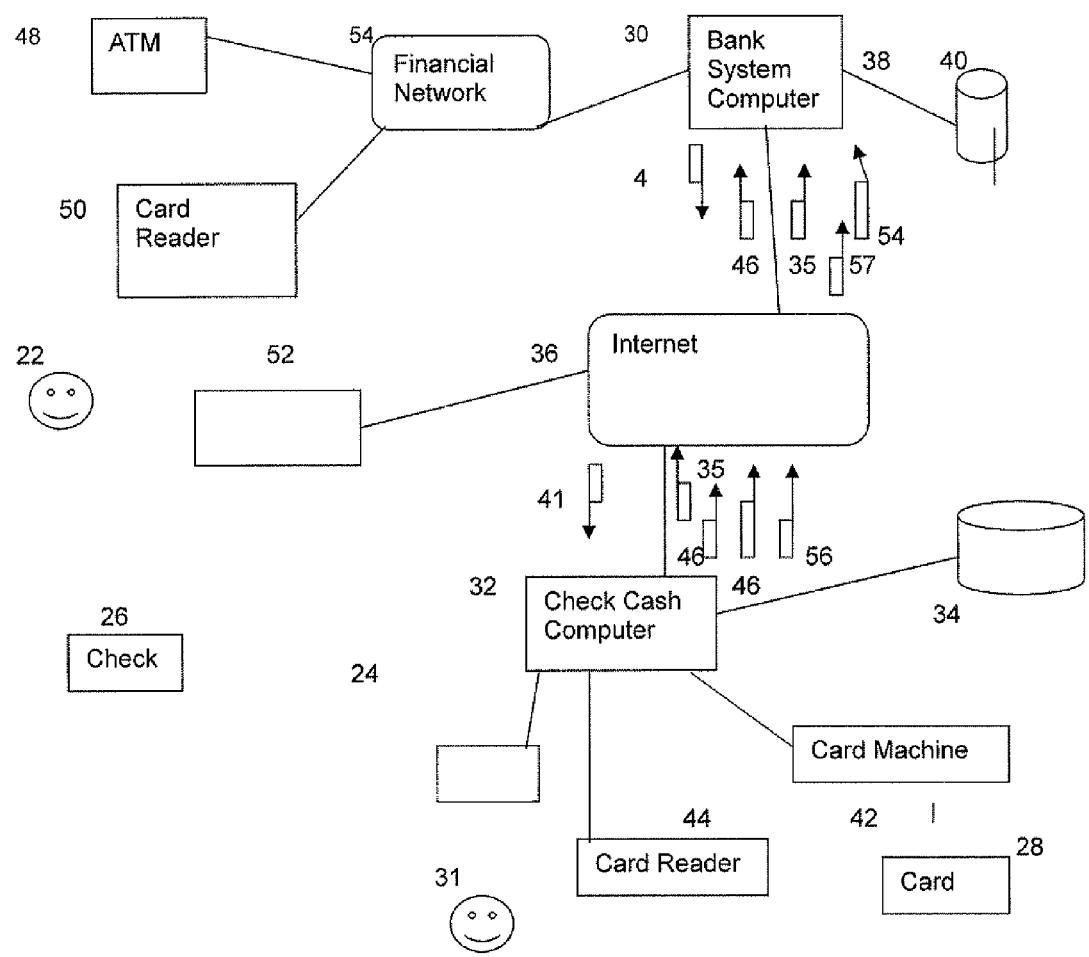
FIG. 1 illustrates a check cashing and payday loan system using a variable amount electronic funds card issued by a financial institution, such as a bank.

Check cashing services usually cash a "pay check" for a person who does not have a checking account (possibly an illegal immigrant or a person who is too "poor" for a bank to seek as a customer) and the service charges a fee that is relative to the size of the check, the payer "reliability", etc. to account for the risk to the service in providing or handing over cash and the pay check later bouncing. Payday loan companies or services provide short term loans to individuals secured by the individual writing a check for the loan amount, a service charge and interest to the company that is dated (and thus cashable) on the date that the individual gets paid whether by paycheck or electronic deposit. Short-term loan companies make short-term loans that are due within a short period of time, such as a month, and the loan typically includes a service charge and interest for the loan period.

The embodiments discussed herein comprise a rechargeable and disposable cash card issued by a check cashing service or loan service where the card can substitute for the cash and is labeled in the name of a bank type financial institution, such as Citibank or Bank of America. The card can be "charged" with a variable amount on money dependent on the size of the check, any reserve, etc. or the size of the loan. The service can have a secure link to the bank and an agreement with the bank to be able to issue such cards with the bank name on them and establish these types of cash card "accounts".

When used at a store for a purchase in front of the card holder's "friends" the card could look a lot like a credit/debit card is being used, raising the "prestige" of the user. In action, it can be similar to a debit card but need not have a name of the holder associated with (or embossed on) it like a gift card, so the user could remain "anonymous" (no social security number required), sometimes an important feature to the underground economy. The name, etc. can be added later as the card is upgraded.

The card can draw on an account or sub account of the check cashing service or of the bank, allowing the check cashing service/bank to "use" the money until debited (free use of the money). If the check "bounces" (for example, for insufficient funds), the check cashing service could "retrieve" any money remaining in the sub account, which reduces the risk somewhat. When used for payday loans, the loan amounts could be registered with the bank via an account identifier allowing the service to "collateralize" the loans with the bank and receive more funds for such services in the form of a loan on the receivables.

The card could be recharged when the user "cashes" another check at the check cashing service (or bank) rather than expire when empty like a gift card. If not recharged after a period of time, the card would expire and could be discarded. When the card is "empty" (and not an upgraded version as discussed below) it could also be discarded and expires. The users name, address, etc. could be added to the card (re-embossed or a substitute card issued by the check cashing service or the bank) at any time so that it would no longer be anonymous.

If the user is a frequent customer or builds up to a "reliable customer", (and, as appropriate, the card is no longer anonymous) the card could change or be upgraded over time into a cash//debit/credit card. In such a situation, say after cashing 10 checks for $500, the card could have a credit limit of say $50 added to it. Maybe after 20 recharges, the limit would go to $100, etc. The reliable use of the card could result in the bank ultimately issuing or converting it to a "real" credit card with a debit card feature. It could also have a savings account feature that would automatically deposit a percentage of a recharge amount into a savings account automatically each time it is recharged, if activated by the user.

The cash that can be provided by the check cash, payday loan and loan companies discussed above can be subject to theft. The embodiments discuss herein reduce the risk of theft.

In a typical situation, a check holder or user 22 (see FIG. 1) comes in to a check cashing facility 24 (or payday loan service), cashes a check 26 (or obtains a loan) and leaves with an amount of cash that is the amount of the check (or loan) less a service fee (and interest if a payday loan). In the embodiments discussed herein, instead the user could leave with an electronic card 28 "containing" the "variable" amount of cash the user would have normally received from the facility 24.

The card 28 can be a "one time use" cash card issued on behalf of a financial institution 30, such as a bank, associated with the check cashing facility 24 where the user is anonymous and with the user taking the risk of the loss of the card 28 and where the card "expires" and is no longer usable when the card balance reaches zero. The card 28 can be (or can be upgraded into) a "rechargeable" cash card issued on behalf of the financial institution 20, such as the bank, associated with the check cashing facility 24 where the user 22 is anonymous and with the user 22 taking the risk of the loss of the card and where the card can have additional money/funds added to it when the user 22 "cashes" another check at the check cashing facility 24. The card 28 can be (or upgraded into) a debit card issued on behalf of the financial institution 30, such as the bank, (or facility 24) with which the check cashing facility 24 has a relationship where the user 22 is not anonymous and where if the card 28 becomes lost or stolen, the user 22 can be reimbursed for any losses and where additional funds can be deposited into the card account at the check cashing facility 24 or the financial institution 30. The card 28 can also be (or be converted into) a combined debit/credit card where again the user 22 is identified, losses are protected and some "overdraft" is allowed based on a credit limit established for the user 22. The card 28 can also be or convert into a credit card if the user establishes a formal banking account relationship with the financial institution 30 (or facility 24) and still be used for depositing funds into the account of the user 22 at the financial institution 30 (or facility 24).

In the situation discussed above, the facility 24, when presented with the first check 26 to be cashed by user 22 or with the payday loan request, has the facility operator 31 determine an amount that the user 22 will receive after the check cashing fee, loan fee and/or interest, etc. is considered. If the user 22 desires to have an electronic cash or funds card 28, the facility operator 31 using a graphical user interface (GUI) (see FIG. 6) of a check cashing facility computer 32 completes a card request form indicating a type of card, and amount of money to be provided on the card, and as needed, depending on the type of card, the users identity, address, social security number, etc. The computer 32 can be a typical desktop type machine. As an example, the user may present a $100 check and the amount to be provided on the card may be $90 ($100 less a $10 fee) or the user may present a $200 check and the amount to be provided on the card may be $185 (200–15 fee). Or the user may present a check stub from a previous paycheck where the stub indicates a paycheck amount of $500, the amount placed on the card could be $470, taking into account a fee of $25 and interest of $5. That is, the amount placed on the card is variable. In addition, depending on the rules of the facility 24, the card may have a "hold back amount" or reserve amount of money that the user 22 does not have access to for a few days after the card is activated, so that the check can clear. For example, if the amount to be placed on the card 28 is $300, there may be a hold back of 10% or $30 in this example, for a period of 3 days. During the three days if the user 22 attempted to purchase more than $270 of merchandise, an insufficient funds message would be provided to the user 22. The computer 32 can store this information in a database 34 (see FIG. 5) of the facility 24.

The facility computer 32 can then send a card request transaction 35 over a secure channel of a communication network 36, such as the Internet, to a financial institution computer 38, such as to a bank over a channel such as a home banking or ATM channel. The computer 38 can be a server type machine or a network of machines. The card request transaction indicates the type of card requested, the amount of money, etc. The transaction is stored in a database 40.

The financial institution computer 38 can debit a check/loan facility account in the database 40 of the institution 38 for the amount, create an account for the card of the type requested, including an amount of funds credited to the card, a card identifier number (account number), user identity information, check cashing facility identification information, security information, etc. and (if approved as needed) transmit an authorization transaction 41 to the facility computer 32.

The computer 32 can store the authorization transaction 41 and the information thereof such as the card number, amount of money authorized, identity, etc., in the facility database 34. This authorization transaction 41 authorizes the facility computer 32 at the check cashing company or payday loan company, to produce an electronic card via a card machine 42. The computer 32 can create any needed card record to be stored in database 34 that includes the amount of money "on" the card, the type of card, as needed a card ID, user identity, etc. and can send the record to the card machine 42 with a command to produce the card. As needed by the type of card, the card machine 42 can produce an electronic card 28 with any needed embossing of card number and user name, encoding/encrypting of a card electronic/magnetic stripe or smart card chip with card number, amount, financial system routing number of the financial institution computer, and security information, such as a password, etc.

A card reader 44 can then scan the card 28 and the information on the card can be displayed on the facility computer 32 to allow the operator 31 to confirm that the card 28 is the type requested and includes the requested amount of money, and other information needed for the type of card. When the produced card 28 is verified, the cashing facility computer 32 can send an issue confirmation transaction 46 to the financial institution 38 confirming that the card 28 has been issued. The institution computer 38 can then activate the card 28 and update database 40 accordingly. The user 22 can immediately (in a few seconds) access the funds "on" or credited to the card 28 via an ATM 48, make a purchase at a retail facility, such as a grocery store, using a card reader 50, online, etc.

Once the card 28 has been provided to the user 22, the user 22 can then use the card 28 for a purchase via card readers 50 at retail facilities, such as a grocery or clothing store, can obtain cash via an automated teller machine 48 (ATM) and via electronic purchase using a computer 52, such as purchase from a web store like as Amazon. In each of these situations, a conventional electronic debit type transaction is sent to the financial institution 38 using the routing number, card number, etc. over a financial network 54 and the amount of money on the card and stored in the database 40 of the institution is debited and a credit is issued to the financial institution associated with the purchase transferring the purchase amount from the user 22 to the seller Each time a debit occurs, the check cashing facility computer 32 can be optionally informed so that the database 34 of the facility 22 can be updated.

When the card is empty or when another check is to be cashed or loan obtained, the user can return to the facility 22 to cash a second check, etc. and obtain another/second or recharged card as desired. If the original card 28 is a rechargeable type card (or a debit, debit/credit card, loan type), the user 22 can chose to add the amount (less fees, etc.) of the second check or loan to the card. To do this, the card 28 (rechargeable or non-rechargeable) can be scanned by the card reader 44 and the information of the card 28, is displayed on the display of the facility computer 32. In obtaining this information, the computer 32 can send a status request transaction 54 to the financial institution computer 38 using the card identifier and the institution computer 38 can return the card status information obtained from the database 40 and such can be stored in database 34. The facility computer 32 can also obtain status information from the facility database 34. This information can include the card number, the amount currently on the card (which can be an amount owed if the card 28 has a credit capability), an amount history of funds amounts placed on the card 28, a number of times the card 28 has been recharged, user name and address, etc. Using the status information, a form GUI can be displayed on the facility computer 32 that allows the card to be recharged, the form is completed by the operator 31 with the amount to be placed on the card and an update transaction 56 is transmitted to the computer 38 and database 34 can be updated. The computer 38 can update the database 40 with the added amount of funds credited to the user (and debited from the facility account), send an authorization transaction to the computer 32 where it can be stored, the card can be updated by the card machine, verified, etc.

If the user has cashed checks or obtained loans for non-rechargeable cards a number of times or the card 28 has been recharged a number of times greater than a threshold number indicating that the user is a "reliable" customer for the type of the current card as set by the facility 24 or financial institution 34 using a scoring model, such as a credit scoring model, the facility computer 32 can display a prompt to the operator 31 to ask the user 22 if the user 22 would like to upgrade the card type from non-rechargeable to rechargeable, or from rechargeable to debit, or from debit to debit/credit, etc. depending on the type of the current card. If the user agrees to an upgrade, the display GUI can be updated with the needed information, such as the change to the card type, status, name address, etc. as needed for the upgraded card. The information, including the amount to be added to the card can be sent in an upgrade update transaction to the financial institution, the computer 38 can change the type of card, etc. in the institution database 40, the institution computer 38 can send an authorization transaction to computer 32, the facility database 34 can be updated and the card machine can update the current card or produce a new card as needed. For example, if the card is recharged the magnetic stripe or smart chip of the current card can be updated with the new balance and if the card is an upgraded card, such as from cash to debit, the card machine 42 can produce a new card with an appropriate magnetic stripe, embossing, etc.

Of course, if the card 28 is a credit type card, the amount to be added to the card can be adjusted by a payment on the debt accumulated on the card for any credit transactions for which the card has been used. For example, assume the card is the credit type, and the card has been used to charge $100 for purchases, when a new check is cashed (or loan taken), say for $500, a payment can be automatically be made, say a minimum payment of 10% of the balance, in this case $10, on the credit card along with accounting for fees, etc.

Figure 2:
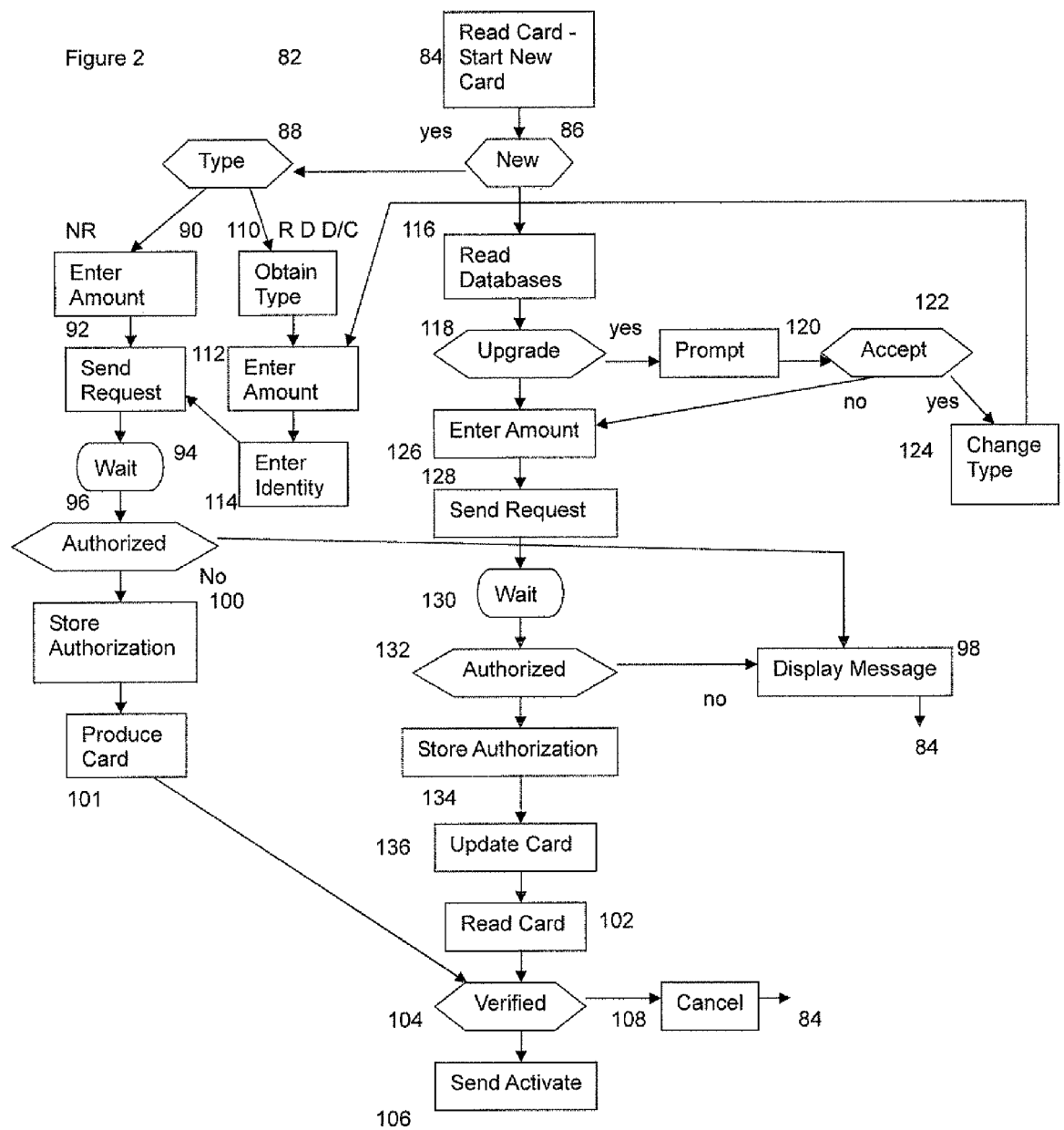
FIG. 2 illustrates a process performed at a check cashing/loan facility.

A process 82 (see FIG. 2) performed by the check cashing facility computer 32 can begin 84 with the operator activating a button or control on a GUI to indicate a new card is to be issued or by the card reader 44 being used to scan a card. The system of the institution computer 32 can determine 86 if a new card is being created, if so, the system can determine 88 the type of card from the inputs by the operator. If the card type is non-rechargeable (NR), the system can obtain 90 the amount to be placed on the card 28 from the GUI 392 (see FIG. 6) edited by the operator, send 92 the request to the computer 38 and wait 94 for a reply. Note the request 92 may also include other types of request information, such as a request for a card upgrade. Additional information may also be included in the request, such as the check routing number that will allow the computer 38 to confirm that the funds are available in the account of the writer of the check to cover the amount of the check. If the reply from the financial institution 30 is not 96 a card authorization, a message can be displayed 98 to the operator 31 concerning the problem and the process can return to allow the operator to start 84 the process again as desired. Or the computers 32 and 38 can enter into an error correction session in which the operator 31 is allowed to correct any information that may be causing the failure of authorization. If the reply is an authorization, the authorization can be stored 100 in the database 34, an appropriate card machine record can be created and the command to produce a card can be sent 101 to the card machine 42. The card 28 can then be read 102 by the card reader 44, the information on the card can be displayed for the operator to verify. If the operator indicates 104 that the card is correct, the institution computer 32 can send 106 the activate transaction to the computer 38 and the card can be activated 106 allowing substantially immediate access to the funds by the user 22. If the card 28 is not correct, a cancel transaction can be sent 108 to the computer 38 and the operator can start again 84. The institution computer 38 can then reverse the debit to the facility master account at the financial institution 30, reverse the credit to the newly created card account, and can return the card number to the pool of unassigned numbers or marked as invalid. As an alternative, the computers 32 and 38 can establish an error correction session in which information in error can be corrected by the operator and the card verified.

If the new card is to be a rechargeable type card (rechargeable cash R, debit D, debit/credit D/C), the type information can be obtained 110 from the GUI as entered by the operator, the amount of funds to be placed on the card obtained 112, and the identity of the user 22, as needed, can also be obtained 114 from the GUI. This information can be sent 92 to the financial institution computer 38 and the new rechargeable type card can be produced, etc.

If a new card is not being created, the system, using the card number from the scanned card (or as entered by the operator), can read 116 the database(s) 34 (and/or sends a request to the computer 38) for information concerning whether the user qualifies for a card upgrade and determine 118 whether an upgrade is appropriate. If so, a prompt can be provided 120 to the operator indicating a type of upgrade permitted. The operator can ask the user whether they would liked to upgrade the card and explain the effect of an upgrade, such as a requirement for the user 22 to provide name and address for the card. If the user accepts 122 the upgrade, the type of the card can be changed 124, the amount to be added to the upgraded card obtained 112, along with identity information 114, as needed, and the card can be produced 101 by the card machine and given to the user.

If an upgrade is not warranted, the system can enter 126 the amount to be added to the card from the operator completed GUI, send 128 an update request to computer 38 and wait 130 for a reply. When the reply is received, it can be checked 132 to see if it is an authorization reply. If not authorized, a message as previously discussed can be displayed 98. If the reply is an authorization, the authorization can be stored 134 in the database 34, an appropriate card record created and a command with the record can be sent 136 to the card machine 42 to update the card 28. The updated card 28 can be read 102 and verified 104 as previously discussed.

Figure 3:
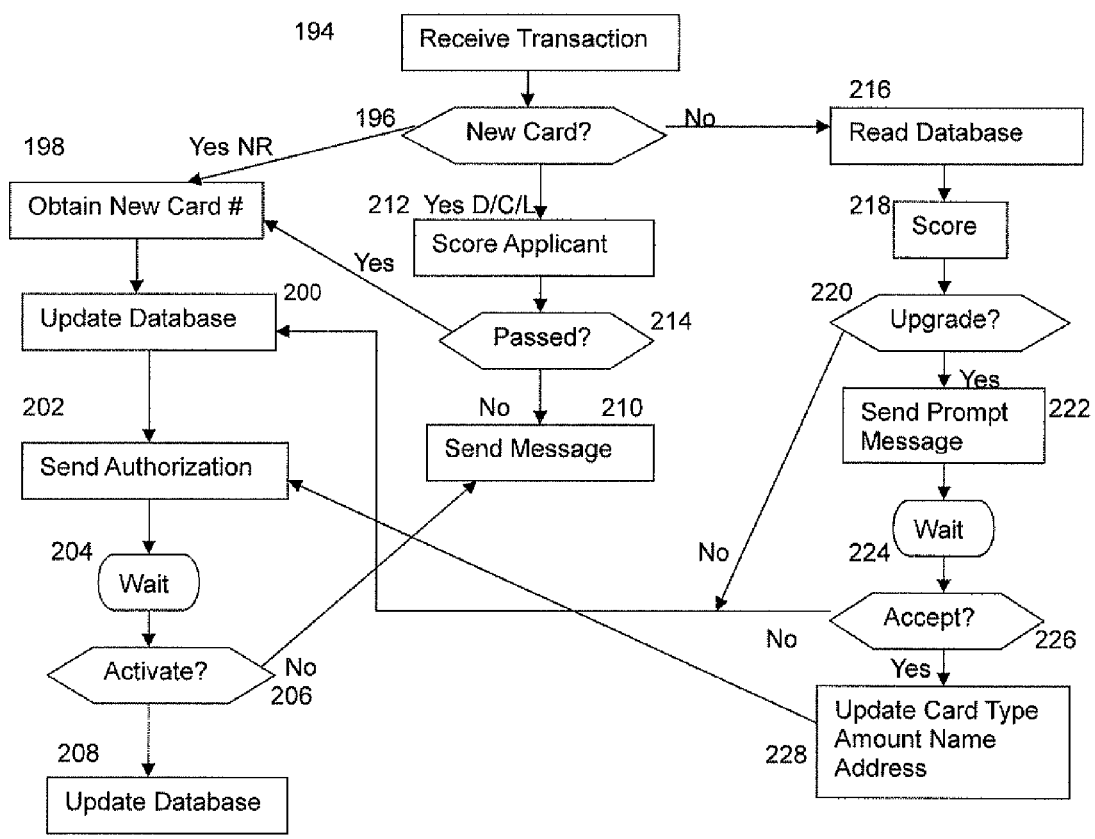
FIG. 3 illustrates a financial institution (or bank) process.

When the financial institution machine 38 receives 194 a transaction from the check cashing facility computer 32, a process 192, as depicted in FIG. 3, can be performed that includes a determination 196 as to whether the transaction concerns a new card. If so, the type of card can be determined from the type in the received transaction. When the type is non-rechargeable, or cash card or rechargeable cash card, a new card number for a new account can be obtained 198 for the type. In this situation a card number assignment application can be queried for the new card and account number. The database 40 can be then updated 200 with the new card/account number and the amount to be credited to the card. The update can also debit the facility account in database 40 for the amount credited to the card. In addition, if the transaction is based on the cashing of a check, such as a pay check, bank routing information from the check can be used to confirm or verify that funds are available sufficient to cover the check and place a hold on the finds in the account of the writer of the check. Other types of transaction also may need verification, such as a payday loan or a short-term loan. Assuming that such verification procedures are completed successfully, an authorization to produce the new card by the facility 24 can then be transmitted 202 to the facility computer 32 via a secure channel over the network 36 to the facility 24 and includes the card number, the funds amount on or credited to the card, information associated with embossing the card, security information, etc. with appropriate portions of the information encrypted. The system 38 can then await 204 a reply. When a reply is received, it can be checked to see if it is a verification transaction that allows the card to be activated 206. When the card is to be activated, the database 40 can be updated 206 to flag the card as active allowing access to the funds. If the card is not to be activated, an appropriate message can be sent 210 to computer 32 and displayed to the operator 31 who can then seek to fix any error.

When the new card type is debit or debit D/credit C/loan L, the user can be scored 212 as to whether the institution is willing to grant a card of the type requested to the user 22. This scoring takes into account whether the facility (check cash or payday loan) is granting the credit/loan or if the institution or bank is participating in or making the loan or providing the credit. If the user does not pass 214 the score test, a message can be sent 210 to the facility machine 32 and displayed to the operator 31 who can then address any problem. If the user passes, the system can obtain 198 a new card number/account for the type requested, the database 40 can be updated 200, etc.

When the received transaction (196) indicates that the card is not a new card, the database 40 can be accessed 216 for the information associated with the card, the user scored 218 to determine 220 whether an upgrade is warranted. If not, the amount to be added to the card can be used to update 200 the database 40. Again this can involve debiting the facility account and crediting the user card account. If the card is a credit type card, a payment on the credit card debt can made along with a credit to the financial institution account for the credit card payment. If the card has a savings component, the appropriate adjustments to add money to a savings account can be made. If an upgrade is warranted, an upgrade offer prompt message can be sent 222 to the facility machine 32 where it can be displayed to the operator 31 who can query the user 22 about whether the upgrade offer is accepted. The computer 38 can wait 224 for a reply. If the reply indicates that the offer is not accepted 226, the database 40 can be updated 200 as discussed previously. If the upgrade is accepted 226, the card type in the database 40 can updated 228 (a new number is obtained, if needed), the amount updated and as needed the address, name etc. for the user 22 can also be updated. An authorization for the new type card can be sent 202 to the facility for production or update by the card machine 42 as needed.

Figure 4:
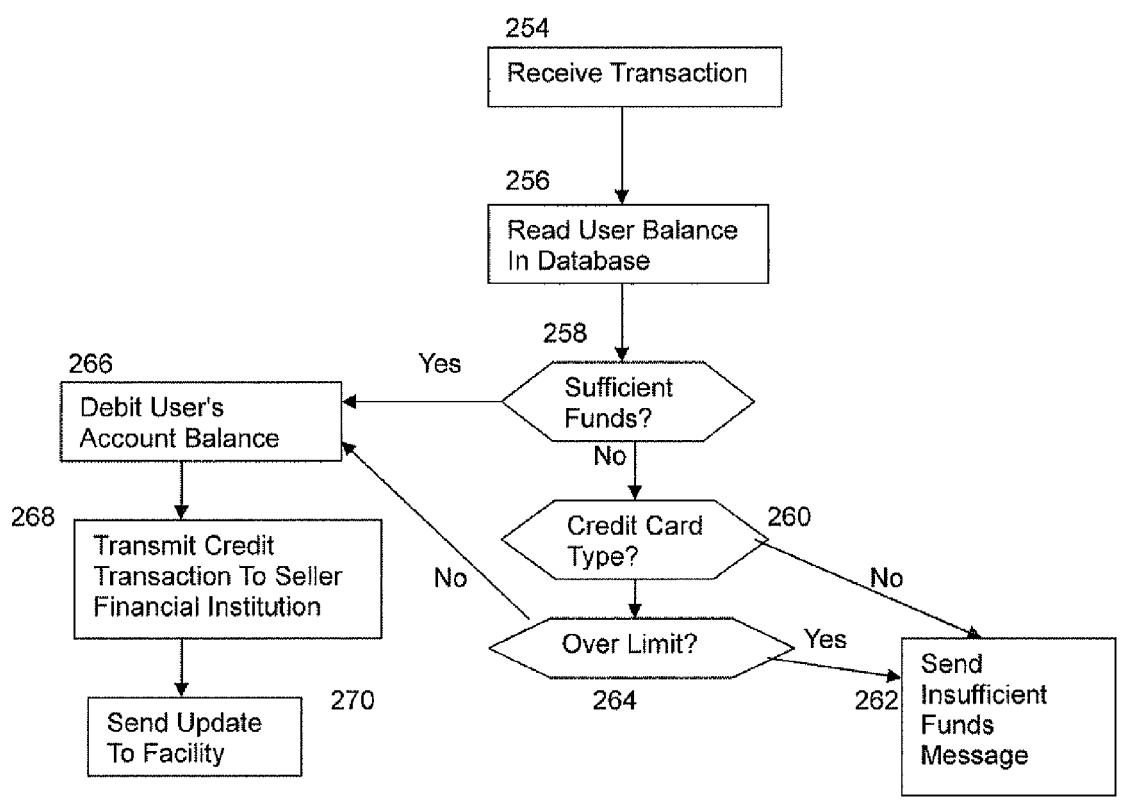
FIG. 4 illustrates another process of the financial institution.

When the financial institution machine receives 254 a debit transaction, such as a debit transaction that the user initiates by making a purchase at a retail store (or a cash withdrawal from an ATM), as depicted by the process 252 of FIG. 4, the computer 38 can access 256 the database 40 to obtain the account information (facility, facility routing number, card type, credit limit, if any, etc.) and funds balance information. The transaction can identify the source of the transaction, the amount of the debit, the routing number of the financial institution serving the source, etc. The amount of the debit transaction can be compared 258 to the account balance to determine whether there are sufficient funds in the account for the card to cover the debit transaction. If not, the system can check 260 to see if the card type is a debit/credit card type. If not a debit type, the computer can send 262 an insufficient funds message to the source of the debit transaction, such as the retail establishment, to deny the debit. If the card is a credit type, the credit limit in conjunction with the current balance can be compared 264 to the debit transaction amount to determine whether the credit limit would be exceeded by the transaction. If so, the insufficient funds message can be sent 262. If there are sufficient funds or a sufficient credit limit or a sufficient combination, the user's card account balance can be debited 266. The source of the transaction can be then credited 268. If the source is a customer of the financial institution 30, the account of the source in the database 40 can be credited. If the source is not a customer of the institution 30, a credit transaction can be sent to the financial institution of the source using the routing institution number in the transaction. Of course any debits/credits needed to reconcile this credit transaction between financial institutions can also be made in the books of the institutions. The computer 38 can then send 270 an update of the user's balance to the facility computer 32 where database 34 is updated, if needed.

A database 34 that can be used by the check cashing facility 24 is illustrated in FIG. 5. The database 34 can include a series of records 312 associated with the issued cards and cardholders along with a record 314 for the check cashing facility itself. The card record 312 includes a card identifier 316, such as a card number that appears on a typical debit card. If this card includes any related accounts, such a savings account (that could be credited each time funds are to be added to a card, check amount−savings amount=card amount), the record would also include such account numbers linked to this ID 316. A type field 318 specifies the type of card (non-rechargeable cash, rechargeable cash, debit, loan, etc). A balance field 320 can hold the current card balance (positive when cash and negative when a loan) when the facility 24 is updated with the current balance. A reserve field 322 and a reserve time field 324 can hold the amount of money being reserved and the amount of time or release date indicating when the reserve amount is released to the user 22 after a card is created or recharged, Name 326, address 328, social security number and other user identification fields can also be provided. A financial institution identification field 330 can be provided that can include the name address, institution identification, such as institution financial system electronic routing number. A card status field 332 indicating card status (active, expired, lost, etc.) can also be provided. A card expiration date field 334 can also be included in the record. This database 34 can also include other information not shown, such as the history of the use of the card (credit/charge and debit transactions list), credit score of the holder, an amount of each check cashed, a check cashing fee applied by the facility, interest applied to a payday loan, a fee amount if any applied by the financial institution 30, savings increment, etc.

The database 34 also includes the facility record 314. This record 314 can have a field for storing the facility identifier 352, which like the financial institution ID field 330 noted above, can include check cashing facility identification information including address, financial network routing number, etc. The balance 354 of the check cashing facility account at the financial institution associated with the identification field therefore 356 can also be included. If the facility provides both check cashing and payday loan services, two fields may be needed, one for checks cashed and one for loans made. If the facility 24 interacts with more than one financial institution, the fields 354 and 356 can be duplicated as many times as needed.

The database 40 of the financial institution 30 could also include the card/user information stored in the database 34 as well as the information of the check cashing facility 24 (such as account balance), and in addition, can include the detail information associated with the card transactions, such as the retailer name, retailer ID, purchase ID, type (purchase, cash withdrawal) etc. of the transactions made on the card.

A graphical user interface (GUI) 392 that can be used for issuing new cards or recharging previously issued cards is depicted n FIG. 6. The GUI 392 includes a balance display field or frame 394 where a current balance on the card is displayed. An amount of a check being cashed or payday loan being made can be displayed in an amount frame 396. Any fee (including interest if a loan) charged by the check cashing facility and/or the financial institution facility can be displayed in frame 398. Any reserve amount and reserve expiration date can be shown in frames 400 and 402. An amount to be added to the card and available for immediate use (check minus reserve) based on any fees, reserves, etc. can be optionally displayed (not shown). The users name and address, depending on the type of card to be issued can also be displayed in frames 404 and 406. A card identifier (ID) as issued by the financial institution 30 can be displayed in frame 408. A type of card can be indicated in frames 410-419. Any account linked to the card, along with any balance therein can be shown in frames 420 and 422. If the card has a savings component or a debt payment component, a frame 424 can be provided where the amount to be transferred is shown and which adjusts the amount displayed in frame 394. Other frames (not shown) can also be provided for displaying other information, such as messages from the financial institution, card status, credit score, etc.

Figure 7:
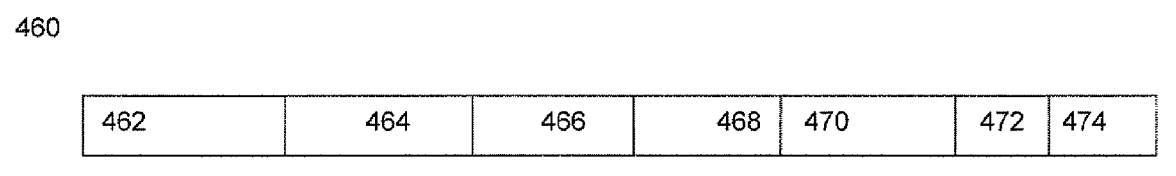

Each transaction that is transmitted among the entities involved with this system has a number of fields. For example, a non-rechargeable cash transaction 460 (see FIG. 7) where the user is cashing a paycheck can include a field 462 for the amount of the check, a field 464 for the amount that is deposited on the card, a field 466 for a reserve amount, a field 468 for any fee and a field 470 for an expiration date, a field 472 for the financial institution routing or identification information and a field 474 for a facility identifier. The other transactions of the system will have appropriate fields as discussed herein.

The card issued to a user 22 as discussed above can be a number of different types (cash, debit, credit, etc). Additional types are also possible. For example, the credit card type can have an automatic payment capability that pays on any debt that has been accumulated by using the card. The payment can be made each time the card is recharged or at periodic intervals, such as once a month, when the balance is positive. The payment can be minimum amount, a fixed payment amount or a payoff that brings the debt to zero. The transfers associated with this card type can occur during the operations discussed above.

The card, if identity information is provided, can also include a savings component as mentioned above. The card can be associated with a savings account or type of funds accumulation account (college savings, etc) where each time the card is recharged a transfer of funds into the savings account occurs. The transfer can also occur periodically, such as once a month when the card has a positive balance. The amount transferred can be a percentage of the recharge amount or card balance, a fixed amount, etc. The transfers associated with this card type can occur during the operations discussed above.

When the card is debit/credit or credit type card, the credit capability can have a low limit when initially created or upgraded to allow for "overdrafts" with the limit rising over time, as the financial institution or facility deems appropriate based on the credit score of the user, etc.

The cards can also be the type that earns interest. That is, positive balances on the cards can earn interest for the users 22 and if so, the balance on the card maintained by the check cashing facility may need to be updated or the interest placed in the savings/checking component.

The user cards/accounts at the financial institution 30 can be set up as sub accounts of the master check cashing facility account, allowing the check cashing facility to earn interest on un-spent funds on the cards. Alternatively, the cards/accounts can be set up as sub accounts of the financial institution master account (such as a bank master sub account) where such unspent funds provide funds available for other uses by the financial institution, such as overnight lending to other institutions.

If the financial institution 30 charges a fee for a new card or for adding funds to a card or for any purchase transactions made with the card, these fees are debited from the amounted credited to the card during the above discussed operations.

As discussed above, this card system can be integrated with a payday loan service where the user 22 obtains a loan in advance of a pay check and provides a post dated check that is dated the pay day and that the facility 24 deposits on pay day. In such a service, when the check is deposited by the facility, the loan, that is the negative balance on the card, can be converted into a positive balance, if using the card has not spent all of the funds of the check. For example, assume that the user obtains a payday loan of $100 and with the service charge and interest post dates a check for $110. The card has a cash balance (the loan) of $100. Assume that the user has spent $75, then when the check is deposited, the loan of $100 becomes a positive cash balance of $25. This service will also work for a conventional short-term loan where the card is charged with the cash amount of the loan and when the loan is paid any balance remaining on the card becomes a positive cash balance.

The discussion above has considered a situation where a single check cashing facility interacts with the financial system. It is possible for there to a chain of such facilities that have a database for each site and/or a master database for the chain is maintained for the chain. The transactions can be routed through a chain master computer to the financial system.

As mentioned above, any loans to users can be made by the facility 24 or by an entity of the financial system, such as the bank, or by both where the risk of default is shared. The authorization transaction sent to the bank in such a situation would include a filed indicating this type of shared risk transaction and the credit scoring for approval of the transaction can reflect the risk sharing. Other financial institutions can also be involved, such as savings and loan companies and credit unions.

The card can be provided with a personal identification number (PIN) that would need to be entered into a transaction terminal for getting cash or making purchases to discourage theft of the card.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of a communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A process, comprising:

performing a financial transaction of a variable amount of money with an individual at a non-financial institution where the financial transaction is one of cashing a check, making a short-term loan and making a payday loan;

requesting permission to issue from a financial institution and issuing, at the non-financial institution, a variable amount electronic funds card of the financial institution including the variable amount where the electronic funds card comprises a non-rechargeable and disposable, anonymous cash card where the variable amount credited to the card is adjusted responsive to a transaction fee charge and a reserve amount having a reserve time period;

upgrading, by a processor, the non-rechargeable and disposable cash card to a rechargeable cash card, upgrading the rechargeable cash card to a debit card, upgrading the debit card to a debit card with a savings component, and upgrading the debit card with the savings component to a debit and credit card with a savings component responsive to a transaction history of the individual;

transferring the variable amount from a facility account to the financial institution;

transferring a transaction amount from the financial institution to a third party with whom the individual conducts a third party financial transaction by presenting the card for the third party transaction to the third party and debiting the variable amount of the card by transaction amount; and allowing the individual to add another variable amount to the card via another financial transaction at the non-financial institution where the financial transaction is one of cashing a check, making a short-term loan and making a payday loan when the card is rechargeable.

* * * * *